Jan. 13, 1942.　　　D. H. GRANT　　　2,269,530
CORN CUTTER AND LOADER
Filed March 19, 1941　　　3 Sheets-Sheet 1

INVENTOR.
David H. Grant
BY
Fred C. Matheny
ATTORNEY

Jan. 13, 1942.  D. H. GRANT  2,269,530
CORN CUTTER AND LOADER
Filed March 19, 1941  3 Sheets-Sheet 3

INVENTOR.
David H. Grant
BY Fred C. Mathery
ATTORNEY

Patented Jan. 13, 1942

2,269,530

UNITED STATES PATENT OFFICE 2,269,530

CORN CUTTER AND LOADER

David H. Grant, Seattle, Wash.

Application March 19, 1941, Serial No. 384,086

6 Claims. (Cl. 56—60)

My invention relates to a corn cutter and loader and my present invention is in the nature of an improvement on the corn cutter and loader disclosed in my Patent No. 1,708,296, issued April 9, 1929.

An object of my present invention is to provide a simple, efficient and inexpensive machine adapted to harvest green corn or like fodder, cut each stalk into a plurality of pieces and load the same into a rack ready to be hauled to an ensilage cutter where the cutting up of the corn is finished preparatory to putting it into a silo.

My machine does not cut the corn or like fodder crop into ensilage in the field, but only cuts the stalks up short enough so that they may be easily and economically handled, making them easier to load on a rack, making it possible to haul larger loads of the same, making the corn much easier to handle at the ensilage cutter and making it possible to feed the corn faster and more evenly to the ensilage cutter.

While I have herein referred to this device as a corn cutter and loader it will be understood that the same is equally well adapted for handling cane or substantially any other tall row crops commonly used for ensilage.

Another object is to provide a corn cutter and loader that will harvest the corn and cut the stalks up and load the same onto a rack all at one continuous operation so that losses due to curing of the green fodder will be reduced to a minimum.

Another object is to provide a machine of this nature in which the stalks of vegetation, after or about the time they are clut off by a sickle pass into an upright cylinder or drum where they are cut into pieces by a plurality of knives mounted on an upright driven shaft.

Other objects of this invention are to provide a machine of this nature that is strong and durable in construction, not expensive to manufacture and inexpensive to operate because the cutting and loading mechanism is driven from the bull wheel of the machine.

Other objects will be apparent from the following description taken in connection with the accompanying drawings.

In the drawings.

Like reference numerals designate like parts throughout the several views.

Figure 1:
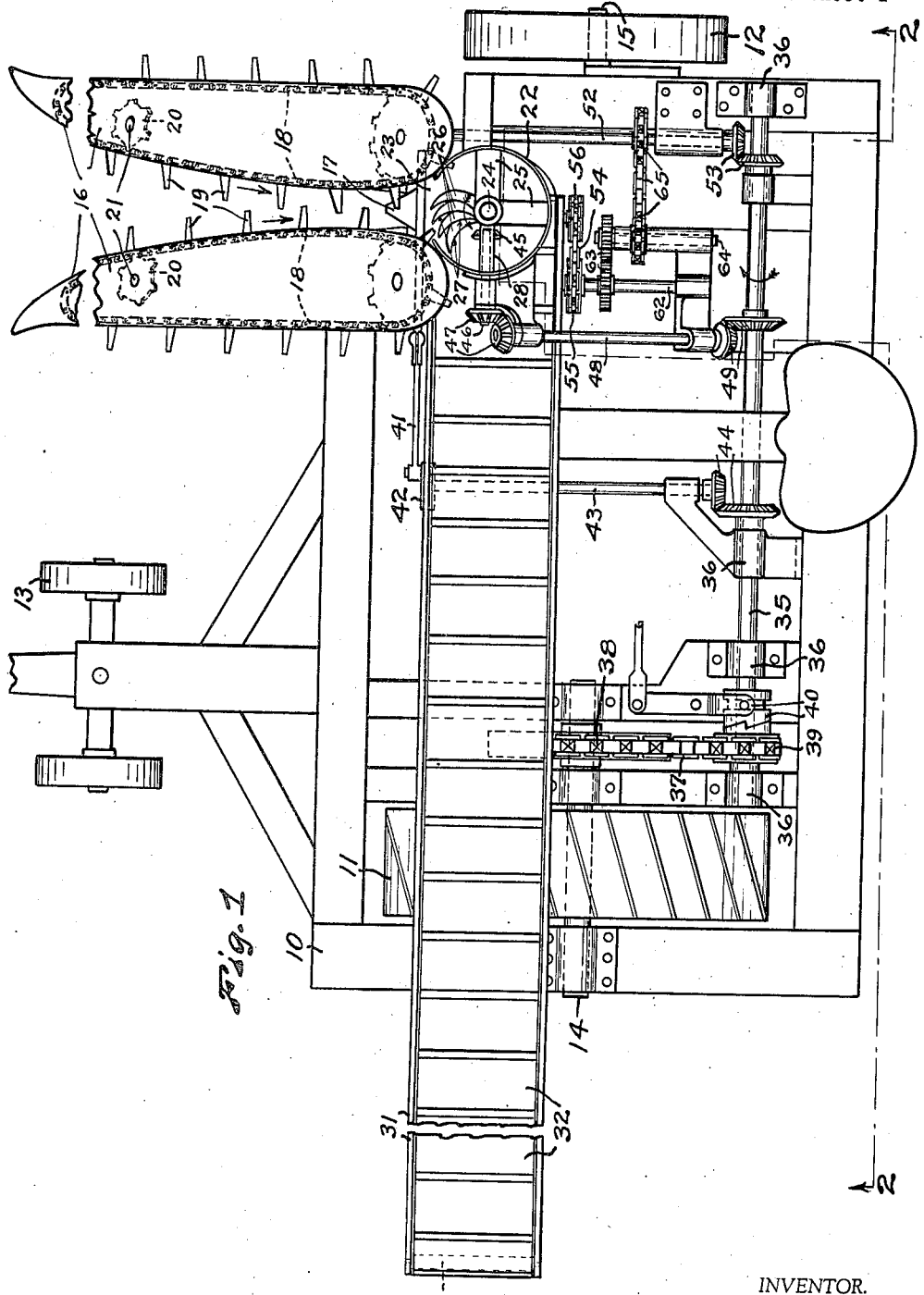
Figure 1 is a plan view of a corn cutter and loader constructed in accordance with my invention.

In the drawings 10 is a frame of suitable size and shape and strength to answer the requirements of the machine, said frame being somewhat like the frame of an ordinary corn binder.

The frame 10 is preferably supported for movement on a bull wheel 11, a grain wheel 12 and a pair of trucks 13.

The bull wheel 11 and grain wheel 12 are respectively mounted on shafts 14 and 15.

Two gathering members 16 are rigid with the frame 10 and extend forwardly therefrom in the usual manner to receive therebetween the row of grain to be harvested and to guide the same to a sickle 17. A plurality of endless moving gatherer members or chains 18 are operatively supported by the grain gathering members 16. These members 18 are of the usual link belt type and are provided with lugs or fingers 19 which engage with the stalks of vegetation and support and guide these stalks and help to straighten them up as the sickle moves toward them.

The link belts 18 pass around driving sprockets 20 which are connected with driven shafts 21 as more fully hereinafter described.

An upright stalk receiving member 22 is fixedly supported on the frame 10 adjacent the rear ends of the gathering members with its lower end close to the sickle 17 and just to the rear of said sickle so that stalks of vegetation will be just within said upright stalk receiving member or just ready to pass thereinto at the time they are cut off.

Figure 2:
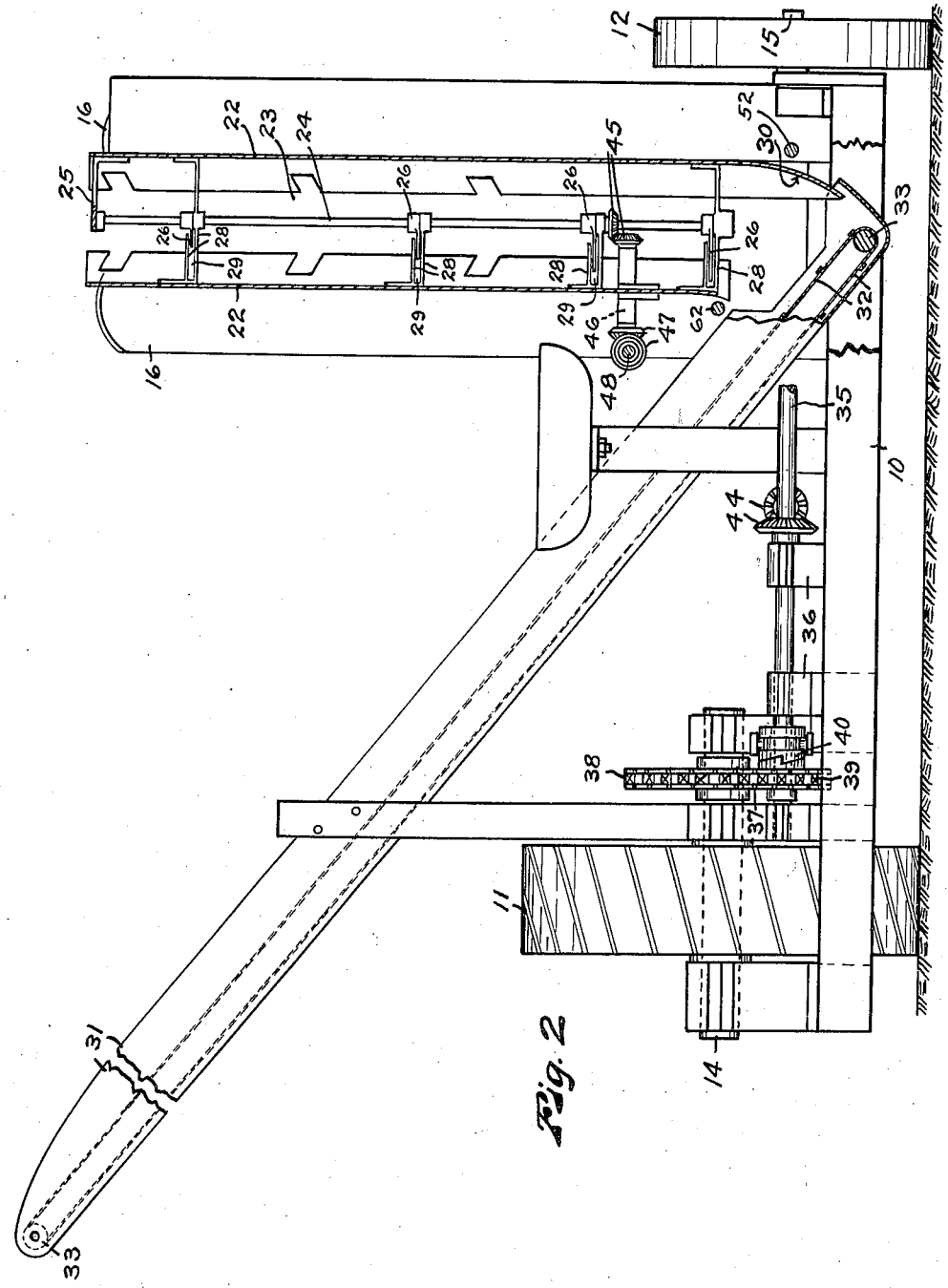
Fig. 2 is a view partly in section and partly in elevation of the same taken substantially on broken line 2—2 of Fig. 1.
Figure 3:
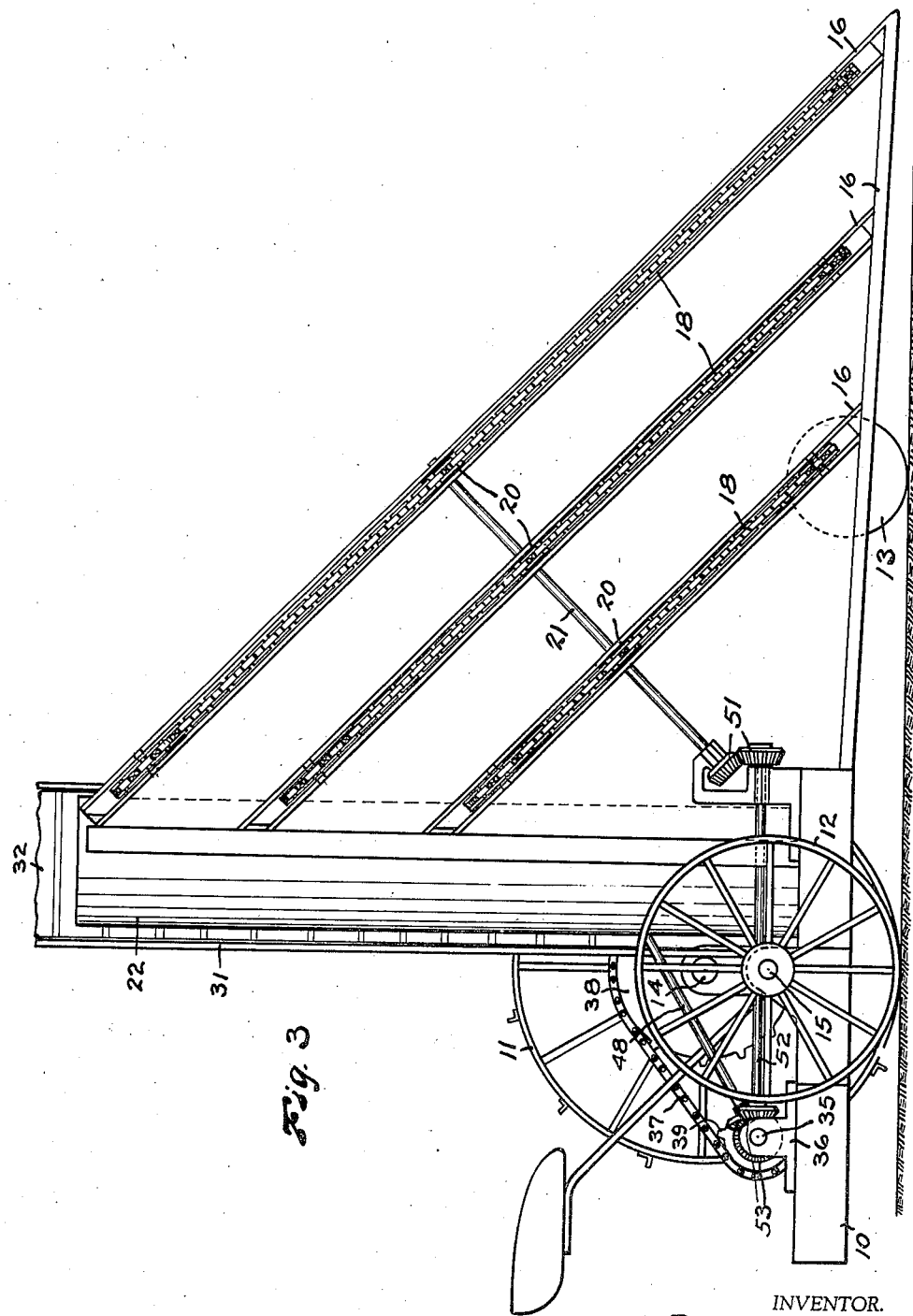
Fig. 3 is a side elevation of this corn cutter and loader.

Preferably the stalk receiving member is of arcuate cross section with a longitudinal slot 23 of from three and one-half to seven inches in width extending from the top to the bottom thereof. Preferably the bottom end portion of the stalk receiving member 22 is cut off at an angle as shown in Fig. 2 to conform to the slope of an elevator hereinafter described.

An upright shaft 24 is positioned axially of the stalk receiving member 22 and mounted in suitable bearings 25.

A plurality of knives 26 are secured to the upright shaft 24 at spaced apart intervals to cut up the stalks of vegetation while said stalks are in an upright position. I have shown four of these knives 26 but it will be understood that a greater or less number of said knives may be used. These knives may be spaced any desired distance apart but are preferably positioned closer together toward the lower end portion of the shaft 24 than they are toward the upper end portion thereof. Preferably the stalk receiving member is from four to six feet in length.

The knives 26 preferably have cutting edges 27 which are curved concavely, as considered from one end to another of said knives so that the knives will have a hook like action on the stalks as well as a cutting action. This hook like shape of the knives tends to prevent them from driving pieces of vegetation against the sides of the stalk receiving member 22 and outwardly through the slot 23 at the forward side thereof.

Preferably the knives 26 are angularly spaced a short distance apart so they will cut one after another and will all cut through a stalk of material in quick succession. One satisfactory spacing of these knives is indicated in Fig. 1 in which the lower knife is the leading knife and the point of each successive knife thereabove drops back about one inch. Positioning the knives 26 so that they will cut through each stalk one after another in quick succession gives the uppermost pieces of the stalk a better chance to drop clear of the knives after being first cut and before they are again struck by the knives. Some of the pieces of vegetation will be cut in two several times before they drop clear of the lowermost knife but this will be beneficial rather than objectionable. The extent to which the pieces will be cut up while they are dropping to the bottom of the stalk receiving member 22 will depend on the speed of rotation of the knives 26 and this speed of rotation does not need to be high. The parts most liable to be cut several times ore the upper end portions of the stalks and these are of small size and carry the leaves and their bulk will be reduced without requiring much power to cut them up.

A cutter bar 28 is provided at the location of each knife. These cutter bars are rigidly secured to the wall of the stalk receiving member 22 and extend inwardly to the shaft 24 and help to provide bearings for said shaft. Preferably the knives 26 operate through slots 29 in the cutter bars 28. The cutter bars 28, shown in Fig. 1, are positioned at the left of the shaft 24 and over the elevator devices so that the stalks of vegetation will only be carried around about ninety degrees before they are cut. Obviously these cutter bars may be placed at any desired location within the member 22.

A boot 30 at the bottom end portion of the stalk receiving member 22 helps to direct the pieces of vegetation onto the lower end portion of an inclined elevator and conveyor. This elevator and conveyer comprises a frame 31 having an endless carrier 32 movably supported thereby on rollers 33. The endless carrier 32 may be an endless apron with slats on or it may be a slat belt. This carrier 32 extends transversely of the machine over the bull wheel 11 and is adapted to receive the cut vegetation and load the same into a suitable rack that is moved alongside of the machine as the machine travels.

The driving means for the previously described operating parts preferably comprises a shaft 35 journaled in suitable bearings 36 toward the rear of the machine and connected by a link belt 37 and sprocket wheels 38 and 39 with the shaft 14 upon which the bull wheel is mounted. Preferably a clutch 40 is provided so that the shaft 35 may be disconnected to throw the machine out of gear.

The sickle 17 is connected with the main shaft by pitman 41, crank disc means 42, shaft 43 and bevel gears 44.

The upright knife carrying shaft 24 is connected by bevel gears 45, shaft 46, bevel gears 47, inclined shaft 48 and bevel gears 49 with the main shaft 35.

The gatherer chains 18 are driven from the sprockets 20.

For driving purposes the shafts 21 are connected by gears 51 with shafts 52 and 62. The shaft 52 is connected with the shaft 35 by gears 53. The shaft 62 is connected by gears 63 with counter shaft 64 which is driven from shaft 52 by link belt means 65.

The movable conveyor and loader member 32 is driven by a link belt 54 operable on sprocket wheels 55 and 56, one of which is connected with the lowermost elevator roller 33 and the other of which is secured on one of the shafts 52.

In operation, when this device is moved forwardly so as to receive a row of tall vegetation, such as corn, between the gatherer members 16 this vegetation will be cut off a short distance above the ground by the sickle 17. At the time this vegetation is cut off it will be in an upright position and will be supported by the gatherer members 16 and gatherer chains 18 and will either be within the stalk receiving member 18 or just ready to pass thereinto. As soon as the stalks of cut vegetation are within the stalk receiving member 18 they will be caught by the knives 26 and cut into a plurality of pieces and the pieces will be dropped into the boot 30 and guided thereby onto the conveyor 32. The conveyor 32 will load this cut material into a rack that is drawn alongside of the machine under the outer end of said conveyor.

The machine does not require power machinery to operate it as it can be drawn by horses. This makes it an inexpensive machine to own and operate as contrasted with machines which cut the material up fine enough for ensilage before it is elevated in the rack and which require mechanical sources of power, such as gasoline engines to drive them.

The foregoing description clearly discloses a preferred embodiment of my invention but it will be understood that changes in the same may be made within the scope and spirit of the following claims.

I claim:

1. In a harvester for tall row crops, a wheel supported frame; a relatively long upright receptacle carried by said frame and open at the front side to receive upright stalks of vegetation; a plurality of cutter members provided at vertically spaced apart intervals in the receptacle to cut the vegetation into pieces; and means at the lower end of the receptacle for removing the cut vegetation.

2. In a harvester for tall row crops, a wheel supported frame; a relatively long upright receptacle carried by said frame, said receptacle being open at the front side to receive upright stalks of vegetation; sickle means to cut off the stalks of vegetation, a plurality of cutter members provided at vertically spaced apart intervals in said receptacle to cut the stalks of vegetation into pieces; and a conveyor and loader positioned to receive the cut vegetation and load the same into a conveyance.

3. In a harvester for tall row crops, a wheel supported frame; a relatively long upright receptacle carried by said frame, said receptacle being open at the front side to receive upright stalks of vegetation; a relatively long upright driven shaft in said receptacle; and knives on said shaft at vertically spaced apart intervals to cut up the stalks of vegetation.

4. In a harvester for tall row crops, a wheel supported frame; a relatively long upright receptacle carried by said frame, said receptacle being open at the front side to receive upright stalks of vegetation; sickle means positioned adjacent the lower end portion of said receptacle to sever standing stalks of vegetation; a relatively long upright driven shaft in said receptacle; knives positioned at vertically spaced apart intervals on said shaft to cut up the stalks of vegetation that enter said receptacle; and conveyor and loader means operatively connected with the lower end portion of said receptacle.

5. In a harvester for tall row crops, a wheel supported frame; a relatively long upright receptacle of arcuate shape carried by said frame, said receptacle having an upright opening provided in its front side extending from top to bottom thereof; means for guiding standing stalks of vegetation into said opening; a sickle positioned adjacent the lower end portion of said receptacle to sever standing stalks of vegetation; a relatively long upright driven shaft positioned axially of said arcuate receptacle; knives on said shaft at vertically spaced apart intervals to cut up the stalks of vegetation that enter said receptacle; and conveyor and loader means operatively connected with the lower end portion of said receptacle.

6. In a harvester for tall row crops, a wheel supported frame; a relatively long upright receptacle of arcuate shape carried by said frame, said receptacle having an upright opening provided in its front side extending from the top to the bottom of said receptacle; means for guiding standing stalks of vegetation into said opening; a sickle positioned adjacent the lower end portion of said receptacle to sever standing stalks of vegetation; a relatively long upright driven shaft positioned axially of said arcuate receptacle; knives secured to said shaft at vertically spaced apart intervals to cut stalks of vegetation, the cutting portions of said knives being hook shaped whereby they will tend to draw the stalks of vegetation into the receptacle; fixed cutter bars in said receptacle cooperating with said knives in the cutting of said stalks; and conveyor and loader means operatively connected with the lower end portion of said receptacle.

DAVID H. GRANT.